(12) United States Patent
Lynggaard

(10) Patent No.: US 7,202,861 B2
(45) Date of Patent: Apr. 10, 2007

(54) CONTROL OF A UNIT PROVIDED WITH A PROCESSOR

(75) Inventor: Stefan Lynggaard, Lund (SE)

(73) Assignee: Anoto AB, Lund (SE)

( * ) Notice: Subject to any disclaimer, the term of this patent is extended or adjusted under 35 U.S.C. 154(b) by 526 days.

(21) Appl. No.: 10/178,734

(22) Filed: Jun. 25, 2002

(65) Prior Publication Data

US 2003/0014615 A1    Jan. 16, 2003

Related U.S. Application Data

(60) Provisional application No. 60/301,446, filed on Jun. 29, 2001.

(30) Foreign Application Priority Data

Jun. 25, 2001    (SE)    .................................... 0102236

(51) Int. Cl.
*G09G 5/00* (2006.01)
(52) U.S. Cl. ...................... 345/179; 345/156; 345/173; 382/187; 382/188; 340/7.56
(58) Field of Classification Search ........ 345/173–184; 178/18–19; 700/65–66; 715/740; 340/7.56; 382/187, 188
See application file for complete search history.

(56) References Cited

U.S. PATENT DOCUMENTS 5,477,012 A    12/1995    Sekendur 6,628,847 B1    9/2003    Kasabach et al.

FOREIGN PATENT DOCUMENTS

| WO | WO 00/73983 A1 | 12/2000 |
| WO | WO 01/16691 A1 | 3/2001 |
| WO | WO 01/26032 A1 | 4/2001 |
| WO | WO 01/61635 A2 | 8/2001 |
| WO | WO 01/75781 A1 | 10/2001 |

OTHER PUBLICATIONS

Spaker, Rebecca—"Bluetooth Basics". Embedded.com, Embedded Systems Programming [on line], Jul. 2002 [retrieved on Mar. 4, 2002]. Retrieved from Internet: URL: http://www.embedded.com/internet/0007/0007ial.htm>, pp. 1-12. Mar. 4, 2002.

*Primary Examiner*—Richard Hjerpe
*Assistant Examiner*—Duc Dinh
(74) *Attorney, Agent, or Firm*—Birch, Stewart, Kolasch & Birch, LLP

(57) ABSTRACT

The invention relates to a method for controlling a unit provided with a processor. The method includes receiving at least one graphical notation in the form of positions representing a sensor device's movement across a base that is provided with a position-coding pattern, while the graphical notation was made, identifying, based on the at least one graphical notation, at least one command for the unit provided with a processor, receiving an address to the unit provided with a processor, and controlling the unit provided with a processor by sending the at least one command to the address. A computer program product contained within a medium and a device for implementing the method is also provided. The method for controlling a unit provided with a processor uses a sensor device and a product kit for controlling a unit provided with a processor.

33 Claims, 11 Drawing Sheets

CONTROL OF A UNIT PROVIDED WITH A PROCESSOR

RELATED APPLICATIONS

This application claims priority on provisional application Ser. No. 60/301,446 filed Jun. 29, 2001, the entire contents of which are hereby incorporated by reference. This application also claims priority from Swedish Application No. 0102236-7 filed Jun. 25, 2001, the entire contents of which are hereby incorporated by reference.

BACKGROUND OF THE INVENTION

1. Field of the Invention

The present invention relates to methods for controlling a unit provided with a processor, and to a device, a computer program product and a product kit for the same purpose.

2. Description of Related Art

Concurrently with the development of information technology, new opportunities for realization of so-called "intelligent homes" are arising. "Intelligent homes" are dwellings, where one or more electronic devices can be controlled or monitored from units located outside the house.

Examples of devices that can be controlled or monitored remotely are heating devices, for example in holiday cottages, fire alarms, flood alarms and burglar alarms. Other examples of devices that could be controlled remotely or monitored are computers, lighting, irrigation systems, TV, video, music centers, refrigerators, freezers, cookers, microwave ovens or washing machines. A basic requirement is that the device can be provided with or can be connected to a processor which can receive, process and pass on information. The processor should then be capable of being connected to some form of communication network, such as the telephone network or the Internet.

For the intelligent home to be controllable from a remote location, there is a need for a remote control unit. The remote control unit according to existing systems is typically a telephone, mobile telephone or computer terminal, which communicates with the processor via the communication network.

In its simplest form, the remote control unit is a telephone or mobile telephone which communicates directly with the processor by means of predefined key commands or codes. In a more advanced form, the remote control unit is a computer or mobile telephone which communicates with the processor via a computer network, such as the Internet. A problem with using a telephone as remote control terminal is that the user interface is based on pressing keys on a numeric keypad, which can lead to problems, for example in learning or remembering the codes that are to be used. Communicating by pressing keys on a numeric keypad is thus not particularly user-friendly. In addition, a mobile telephone has usually limited data entry facilities on account of its small format. In addition, no or limited feedback is given in response to what has been keyed into the mobile telephone.

The use of a computer with Internet connection is a solution which works providing such a computer is available. In addition, this requires a specific user interface to be developed and adapted for the respective unit which is to be controlled remotely. In addition, people who are not used to computers perceive the use of a computer as complicated and difficult to use.

Another problem is that as the system is developed with more devices that can be controlled remotely, demands are made concerning a uniform standard for their control. For example, it would be time-consuming and thus unsatisfactory to need to look up different Internet home pages in order to control the central heating and the microwave oven.

Hence, there is a need for a method for providing user-friendly and flexible remote control of units provided with a processor, which method utilizes a portable device.

SUMMARY OF THE INVENTION

According to a first aspect of the invention, there is provided a method for controlling a unit provided with a processor. The method includes receiving at least one graphical notation in the form of positions representing a sensor device's movement across a base that is provided with a position-coding pattern, while the graphical notation was made.

Furthermore, the method includes identifying, based on the at least one graphical notation, at least one command for the unit provided with a processor, and receiving an address to the unit provided with a processor.

The method further includes controlling the unit provided with a processor by sending the at least one command to the address.

The graphical notation may be any writing and/or drawing, which is made on a base, using a sensor device, that records positions based on the position-coding pattern provided on the base. The graphical notation may be a single, continuous stroke, or a group of such strokes. Each stroke may be represented as a sequence of coordinate pairs coded by the position-coding pattern on the base. Thus, the user input may be digitized without any additional operation on the part of the user, such as scanning the base or digitizing it in some other way.

Furthermore, according to the present invention, such graphical notations may be used for drawing up a command structure or hierarchy on a base, such as a paper. The command structure may include commands for controlling a unit provided with a processor. This provides a rapid, simple and easy to understand way for the user to control the unit provided with a processor. In addition, by noting down the commands, the user automatically obtains an easy to understand copy of what was entered into the unit.

An additional advantage of the present invention is that the user is not limited to one base which is specific to a particular type of command.

Furthermore, a unit provided with a processor can be a device which contains any form of processor, for example a microprocessor. Examples of such devices are computers, modern household appliances (dishwashers, microwave ovens, cookers/stoves, audio/video players, etc), industrial machinery and other computer-controlled applications such as central heating installations, air conditioning installations, telephone systems and monitoring/alarm systems.

Furthermore, a base can be a device on which information can be noted down, usually a sheet of paper, a drawing board or similar medium which is provided with a position-coding pattern which makes possible electronic recording of what is noted down on the base.

In addition, a command can be such words, symbols, sub-addresses in computer networks, program names, command names, file names, storage addresses or symbols which represent particular operations, functions, operators, parameters and arguments that can be used individually or in combination for controlling a unit provided with a processor.

Further, an address of the unit provided with a processor can be an address for communication with the unit provided with a processor. It can be a computer network address, such as a standard IP address, but other forms of address are possible. It can also be an address of a unit via which the unit provided with a processor communicates, for example a proxy-server or a unit for short-range communication such as Bluetooth®. Thus it is also possible to utilize the invention when the user is in the vicinity of the unit provided with a processor without having to connect, for example, via a computer network. An address can also be expressed as a short name, which is associated with the address. For example, the word "home" can be an indication of a particular computer network address of a computer which is located in the user's home.

Furthermore, making graphical notations may, but does not necessarily, mean that a mark is left on the base. This may provide the advantage that the base will constitute a copy of what was entered into the unit provided with a processor. With the reuse of previously entered commands it can, however, be an advantage if no mark is left on the base, in order to make possible repeated use.

According to one exemplary embodiment of the invention, the at least one graphical notation may at least partly include handwritten characters. Thus, the at least one graphical notation may be at least partly converted into a character coded format for identifying the at least one command. This provides a very flexible way of entering commands, since there is no need for predefining or associating commands with user-friendly symbols.

Alternatively, identifying the at least one command may include identifying at least one graphical symbol from the at least one graphical notation, the graphical symbol representing the at least one command. This way, user friendly symbols, which speed up the making of the graphical notation, may be provided. This variant may be combined with the above described character coded variant, by e.g. providing predefined symbols for frequently used commands or addresses, while less frequently used commands or addresses are to be noted as handwritten characters for conversion to character coded form.

According to another exemplary embodiment of the invention, identifying the at least one command may include detecting a command indicator, based on the at least one graphical notation. Optionally, identifying the at least one command may comprise identifying a subarea of the position-coding pattern, the subarea being essentially encircled by the command indicator. The subarea may be associated with the command.

Further, a command indicator may be a graphically noted indication, which is recognized by the sensor device as an instruction to identify a command. The instruction may be a symbol and in one embodiment of the invention, the symbol may encircle the command, and thus constitute a frame or any other drawn shape, which wholly or partially encircles the command. The frame may have a specific appearance, which is recognized by the sensor device and thus interpreted as the indication that a command is being entered.

By indicating that the command is being entered, the sensor device may more easily be able to interpret a graphical notation as a command.

Furthermore, a sub-area is an area of the position-coding pattern on the base, which area is delimited by e.g. the command indicator or by some other relation to the command, such as a certain area encircling the graphical notation. For example, a halo-like area surrounding the command may be defined as soon as a command is recognized. The subarea may, via the position-coding pattern, be associated with the command, such that a command may be identified based on a recording of any pair of coordinates that falls within the subarea associated with that command.

By allowing the command indicator to define the subarea that is associated with the command, and indicate that a command has been entered, the command indicator may have a dual function: defining the subarea and indicating that a command is being entered.

Thus, according to one exemplary embodiment of the invention, sending the at least one command to the address may be effected in response to a recording of a pair of coordinates within the subarea. This enables "reuse" of a previously noted and recorded command.

According to the present invention, the address may be received in different manners. One alternative is that receiving the address comprises receiving the address from a memory in the sensor device. Thus, the address to the unit provided with a processor may be preprogrammed and stored in a memory in the sensor device. According to another alternative, receiving the address may comprise identifying the address based on the at least one graphical notation. Thus, the address may be noted graphically on the base, recorded by the sensor device and optionally associated with one or more commands.

According to another exemplary embodiment of the present invention, an association between the address and the at least one command may be identified based on the at least one graphical notation. The association may indicate the relationship between the commands or the command and the address.

According to yet another exemplary embodiment of the present invention, receiving at least one graphical notation comprises receiving at least three separable graphical notations representing the address, the at least one command and the at least one association between the address and the at least one command. Thus, the graphical notations representing the address, the command and the association may be clearly distinguishable from each other.

The at least one association may be identified based on a separable graphical notation connecting the graphical notations representing the at least one command and the address, respectively. For example, the at least one association may be identified as a graphical notation having essentially the shape of a line extending between the graphical notations representing the at least one command and It the address. Naturally, associations may also connect two commands, or a command and an address. The associations provide a simple and intuitive way of relating commands, addresses, etc. to each other.

According to another exemplary embodiment of the present invention, there is provided, in a memory in the sensor device, an electronic representation of a command hierarchy which comprises at least two commands and at least one association, each of the at least two commands and the at least one association being graphically represented on the base by nodes and arcs, respectively, and each of the at least two commands being associated with a respective subarea of the position-coding pattern.

A command hierarchy, or a command structure, may be any hierarchy of commands for one or more units provided with a processor. A command hierarchy typically has a root, which may be a command or an address to a unit provided with a processor. Further, the command hierarchy may have, but does not necessarily need to have, a plurality of branches, which may also be referred to as nodes, each branch or node, in turn, having a number of sub branches, such that a tree-like structure is formed. The command hierarchy may be large, thus comprising a large number of command levels and/or a large number of commands on each level. The nodes may be connected by lines, such that each node has one superior node, but may have more than one subordinate node. The lines connecting the to nodes may be interpreted as the associations referred to above, while the nodes may be addresses or commands for controlling a unit provided with a processor. Naturally, one address may in turn have a number of subaddresses to, e.g. different units provided with processors.

The inventive method may further include forming at least one command string based on the command hierarchy, and controlling the unit provided with a processor by sending the command string to the address. A command string is an instruction for a unit provided with a processor, which instruction is built up by more than one command and optionally by an address. The command string may include more than one command.

Furthermore, identifying the at least one command may include receiving a pair of coordinates from one of the subareas, the pair of coordinates representing a chosen command and identifying an electronic representation of the chosen command, wherein the command string is formed based on the chosen command and at least one hierarchically superior command.

The command hierarchy according to this exemplary embodiment may be represented on a base provided with a position-coding pattern. The electronic representation of the command hierarchy may be at least partly provided through identifying the command hierarchy based on the at least one graphical notation. At least partly means that an existing command hierarchy, which is either preprinted or e.g. graphically noted by the user or someone else, may be expanded by the user adding further commands or addresses.

Alternatively, providing the electronic representation of the command hierarchy may at least partly comprise electronically receiving the electronic representation of the command hierarchy. The base, on which the graphical notation is made, may be provided with a graphical representation of at least a part of the command hierarchy. Thus, a base having a preprinted command structure may be provided together with an electronic version of the command structure, which is to be stored in the memory of the sensor device for future use.

According to the present invention, providing the electronic representation of the command hierarchy may also include identifying, based on the at least one graphical notation, at least one further command and at least one further association, and storing, in a memory of the sensor device, the at least one command and the least one further command, based on the at least one further association. Thus, the predefined command structure may be expanded by the user adding e.g. further commands or by the user adding e.g. an address. The command hierarchy may also be used by recording pairs of coordinates within predefined subareas, which are associated with commands in the command hierarchy. Based on such recordings, commands may be sent to the unit provided with a processor, as described above.

The electronic representation of the command hierarchy may be stored in a tree data structure in the memory of the sensor device. A tree data structure may be any data structure for representing a hierarchy or a tree structure. Numerous such data structures are known. According to this alternative, command strings are formed in response to an indication of a command, such as a recording of a pair of coordinates within a subarea that is associated with a command. The command string may be built up starting with the selected command and adding each hierarchically superior command, until the root is reached. Building the command string may also comprise adding separating characters, such as "\" etc., arranging the commands in a suitable order and adding the necessary parameters or switches.

Alternatively, the electronic representation of the command hierarchy may be stored in the form of at least one command string which is formable based on the electronic representation of the command hierarchy. Thus, a plurality, or all, of the command strings that may be formed based on the command hierarchy may be stored in the form of more or less complete command strings. When a command is indicated by e.g. a recording of a pair of coordinates within a subarea, the command string comprising that command is retrieved and sent to the unit provided with a processor.

According to a second aspect of the present invention, there is provided a computer program product for controlling a unit provided with a processor. The computer program product comprises instructions for a sensor device, which, when executed, causes the sensor device to perform the above described method.

According to a third aspect of the present invention, there is provided a sensor device for controlling a unit provided with a processor. The sensor device comprises a signal processor for receiving positions representing the sensor device's movement across a base that is provided with a position-coding pattern. The signal processor is arranged for receiving at least one graphical notation in the form of the positions, identifying, based on the at least one graphical notation, at least one command for the unit provided with a processor, receiving an address to the unit provided with a processor, and controlling the unit provided with a processor by sending the at least one command to the address. The signal processor of the sensor device may be arranged to perform the method described above. The method may be implemented by means of special-purpose circuitry, by programmable microprocessors or by a combination thereof.

According to a fourth aspect of the present invention, there is provided a method for controlling a unit provided with a processor. The method comprises using a sensor device for recording positions representing the sensor device's movement across a base provided with a position-coding pattern, while a graphical notation is made on the base, noting graphically on the base, using the sensor device, at least one command to the unit provided with a processor, and sending the command to the unit provided with a processor for controlling this unit. This method provides a user-friendly and intuitive way of controlling a unit provided with a processor.

The method can, for example, be used when a user wants to enter a command string into, for example, a computer or other unit provided with a processor connected to the sensor device, e.g. by wireless means. The method enables a unit provided with a processor to be controlled without using a preexisting user interface, such as a preprinted base provided with command options. Instead, the user may use any base that is provided with a position-coding pattern, on which he or she makes graphical notations, which correspond to the desirable commands and sends the commands to the unit provided with a processor.

According to a fifth aspect of the present invention, there is provided a product kit for controlling a unit provided with a processor. The product kit comprises a control base, provided with a position-coding pattern, on which control base a command hierarchy, comprising at least two commands, is graphically represented, and on which control base each of the at least two commands is associated with a respective subarea of the position-coding pattern, and a computer program product comprising an electronic representation of the command hierarchy, whereby the at least two commands are identifiable based on a recording of a pair of coordinates within its respective associated subarea. Such a product kit provides a way of integrating e.g. a household appliance into a remote control system for an intelligent home.

The electronic representation of the command hierarchy may be stored in the memory of the sensor device, and possibly completed by the user adding an address to which the commands are to be sent, thereby completing the installation of the appliance in the intelligent home. The user may then either use the control base provided for selecting predefined commands, or draw up the command hierarchy on an arbitrary base and send a command string to the unit provided with a processor.

Further scope of applicability of the present invention will become apparent from the detailed description provided hereinafter. It should be noted, however, that the detailed description and specific examples while indicating the different embodiments of the invention, is given by way of illustration only, since various changes, alterations and modifications coming within the spirit and scope of the invention will become apparent to those skilled in the art from this detailed description.

BRIEF DESCRIPTION OF THE DRAWINGS

Further aspects, features and advantages of the invention will become apparent from the detailed description given below with reference to the accompanying drawings, which are incorporated in and constitute a part of the specification and, together with the description, explain the features and principles of the invention. In the drawings.

DETAILED DESCRIPTION OF PREFERRED EMBODIMENTS

Figure 1:
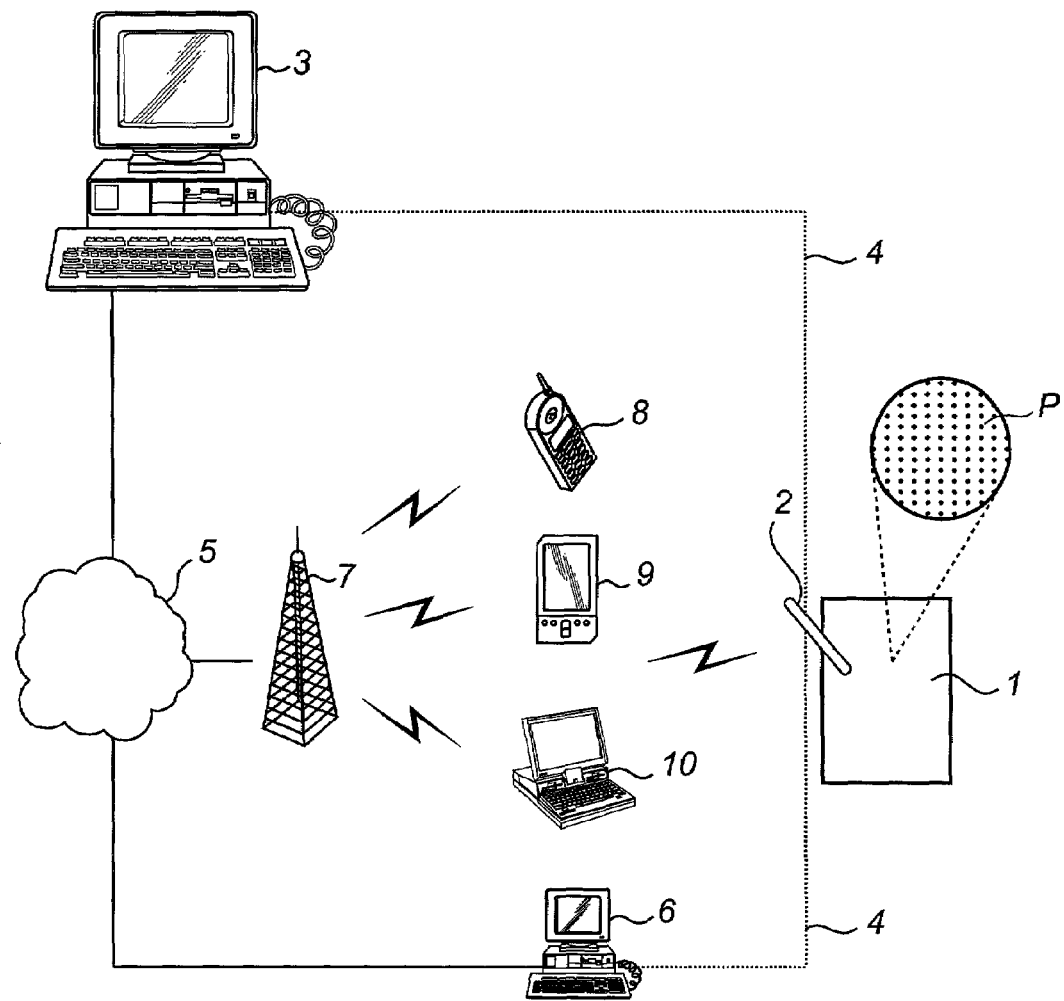
FIG. 1 shows an exemplary embodiment of the system in which the present invention can be used.

For a general understanding of the features of the present invention, references is made to the drawings, wherein like reference numerals have been used throughout to identify identical or similar elements. While the present invention will be described in terms of an illustrative embodiment or embodiments, it will be understood that the invention is adaptable to a variety of control techniques, such that the present invention is not necessarily limited to the particular embodiment or embodiments shown and described herein.

The present invention is based on the general idea of controlling a unit provided with a processor by means of commands which are written on a position-coded base and which thereafter are sent to the unit provided with a processor. Referring now to the drawing figures wherein like reference numerals refer to like elements throughout, shown in FIG. 1, is a base 1 in the form of a sheet of paper, on which commands can be written and a sensor device 2 used for writing commands on the base 1. The commands are recorded in electronic form and sent to a unit 3 provided with a processor, which in FIG. 1 is exemplified by a computer.

The sensor device 2 can communicate with the computer 3 in various ways. One alternative is for the sensor device 2 to communicate directly with the computer 3, for example via a cable, an infrared link or a short-range radio link, such as according to the Bluetooth® standard. This is illustrated in FIG. 1 by a broken line 4. A second alternative is for the sensor device 2 to communicate with the computer via a local or global computer network 5, such as the Internet. The sensor device 2 can be connected to the computer network 5 by means of a computer 6 which is permanently connected to the computer network, and with which the sensor device can communicate in, for example, any one of the ways mentioned above for communication with the computer 3. This is also shown by a broken line 4.

Alternatively, the sensor device 2 can be connected to the computer network 5 by wireless means via a radio access point 7 which is reached, for example, via a mobile telephone 8, a hand-held computer 9, such as a PDA—Personal Digital Assistant, or a portable computer 10. Optionally, these units communicate with the radio access point 7 via each other, for example by the portable computer 10 or the hand-held computer 9 utilizing a modem in the mobile telephone 8 as a link to the radio access point 7, which can be a radio access point in some known system such as GSM, CDMA, GPRS or some other type of mobile communication network.

As an additional alternative, the sensor device 2 can itself have means of communication, making possible direct connection to the radio access point 7.

As mentioned above, the base 1 is provided with a position-coding pattern P. The position-coding pattern P is shown only schematically in FIG. 1 as a surface provided with dots. This position-coding pattern is used to record in electronic form what is written on the base. Various types of position-coding pattern which can be used for this purpose are known. In U.S. Pat. No. 5,477,012, for example, a position-coding pattern is shown where each position is coded by a unique symbol. The position-coding pattern can be read off by a pen which detects the position code optically, decodes it and generates a pair of coordinates that describes the movement of the pen across the surface. In WO 00/73983 and WO 01/26032, which are hereby incorporated by reference, and both of which are assigned to the Applicant of the present application, another position-coding pattern is described in which each position is coded by means of a plurality of symbols of a simpler type and where each symbol contributes to the coding of more than one position. In WO 00/73983 different sized dots are used to code ones and zeros in the position-coding pattern which is binary. In WO 01/26032 four different displacements of a dot from a nominal position are used to code four different pairs of bits in the position-coding pattern. A certain number of dots, for example 6*6 dots, codes a unique position. The position can be calculated from the bit values corresponding to the dots.

The position-coding patterns in WO 00/73983 and WO 01/26032 can be detected optically by a pen that decodes the dots and generates a pair of coordinates for each set of, for example, 6*6 dots. If the position-coding pattern is read off while the pen is writing on the position-coding pattern, a sequence of pairs of coordinates that describes the movement of the pen across the position-coding pattern is thus obtained and thus constitutes an electronic representation of what was written on the sheet of paper.

In the following, it is assumed that the base 1 is provided with a position-coding pattern of the type described in WO 01/26032. However, it should be noted that other types of position-coding patterns, for the purposes of the invention, may have an equivalent function.

Figure 5:
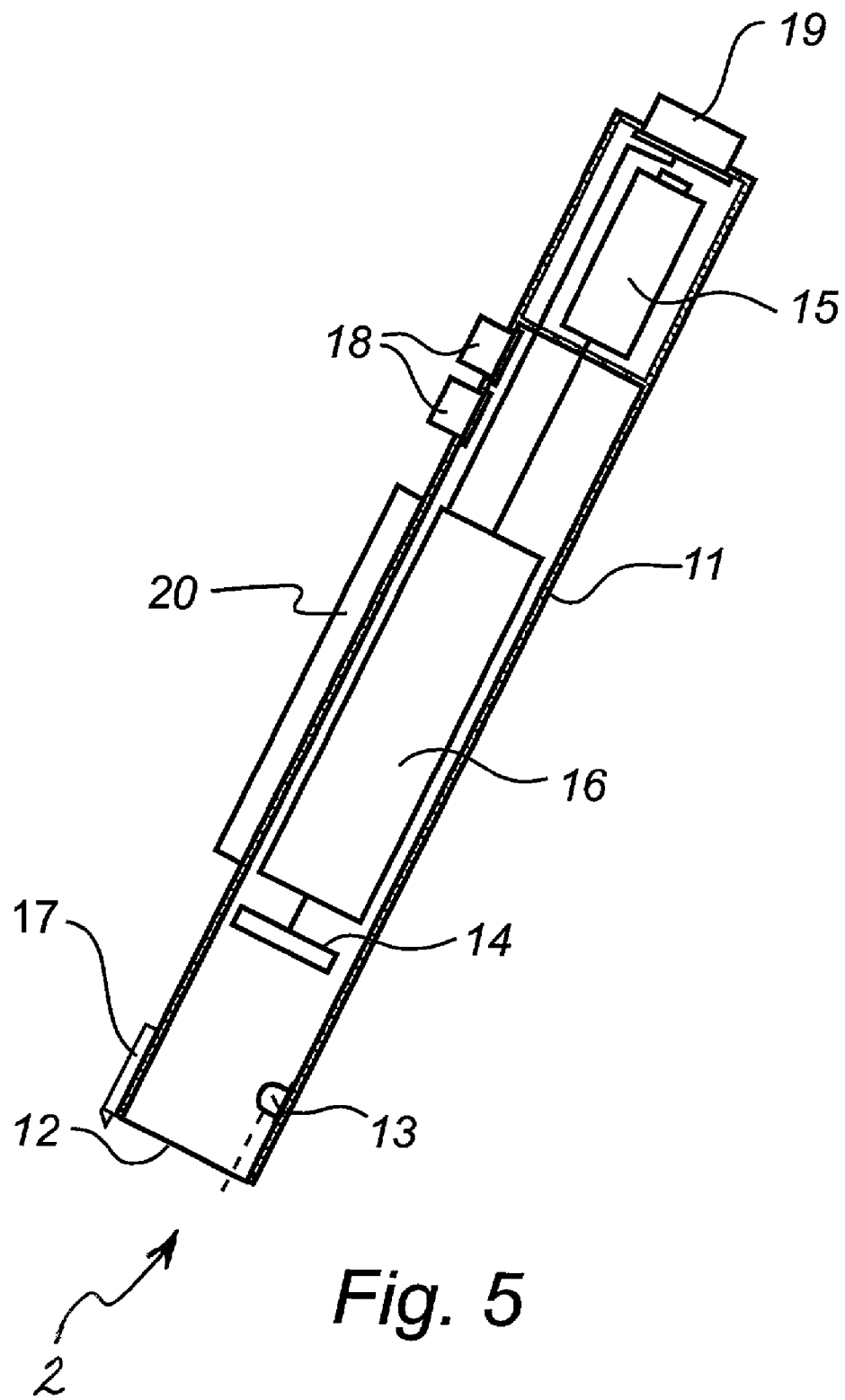
FIG. 5 shows an exemplary embodiment of a sensor device for use in connection with the present invention.

The sensor device 2 can then also be of the type described in WO 01/26032. An example of the construction of such a device is described with reference to FIG. 5.

The sensor device 2 can comprise a casing 11 which has approximately the same shape as a pen. At the end of the casing there is an opening 12. The end is intended to abut against or to be held a short distance from the surface on which the position determination is to be carried out.

The casing contains principally an optics part, an electronic circuitry part and a power supply. The optics part comprises at least one light-emitting diode 13 for illuminating the surface which is to be imaged and a light-sensitive area sensor 14, for example a CCD or CMOS sensor, for recording a two-dimensional image.

Optionally, the device can also contain an optical system, such as a mirror and/or lens system (not shown). The light-emitting diode can be an infrared light-emitting diode and the sensor can be sensitive to infrared light.

The power supply for the device is obtained from a battery 15, which is mounted in a separate compartment in the casing. It is also possible to obtain the power supply via a cable from an external power source (not shown).

The electronic circuitry part contains a signal-processor 16 which comprises a processor with primary memory and program memory. The processor is programmed to read images from the sensor, to detect the position-coding pattern in the images and to decode this into positions in the form of pairs of coordinates, and to process the information thus recorded in electronic form in the way described in greater detail below for controlling the unit 3 provided with a processor.

In this embodiment, the device also comprises a pen point 17, with the aid of which ordinary pigment-based writing can be written on the surface on which the position determination is to be carried out. The pen point 17 can be extendable and retractable so that the user can control whether or not it is to be used. In certain applications the device does not need to have a pen point at all.

The pigment-based writing is suitably of a type that is transparent to infrared light and the marks suitably absorb infrared light. By using a light-emitting diode which emits infrared light and a sensor which is sensitive to infrared light, the detection of the pattern is carried out without the above-mentioned writing interfering with the pattern.

The device may also comprise buttons 18, by means of which the device can be activated and controlled. It also has a transceiver 19 for wireless transmission, for example using infrared light, radio waves or ultrasound, of information to and from the device. The device can also comprise a display 20 for displaying positions or recorded information.

The device can be divided between different physical casings, a first casing containing components which are required for recording images of the position-coding pattern and for transmitting these to components which are contained in a second casing and which carry out the position determination on the basis of the recorded image or images.

According to one exemplary embodiment, the sensor device 2 communicates with other units 8, 9, 10 or 6, by wireless means in a way known to those skilled in the art. The communication between the units 8, 9, 10 and 6 respectively, the radio access point 7, the computer network 5 and the unit 3 provided with a processor also takes place in a way known to those skilled in the art. The function of the sensor, and the application of the position-coding pattern on the base are also methods known to those skilled in the art.

A first application of an exemplary embodiment of the present invention will now be described with reference to FIG. 2. On a base 1, which is provided with the position-coding pattern, is noted a number of phrases or symbols which constitute commands 22, 23 or addresses 21. A command can be a word, but can also be a symbol, provided that the sensor device is pre-programmed to recognize and identify a symbol as a command. Such pre-programming can be carried out by some form of learning, whereby a command is associated with a symbol, as will be described in more detail below.

One of the noted phrases 21 constitutes an indication of a computer network address to which the sensor device connects, e.g. the computer network address where the unit 3 provided with a processor is located. The computer network address can also be some other type of address for computer communication, such as a Bluetooth® address.

Commands are noted on the base in a tree structure, in such a way that an address or an indication of the address constitutes the root and in such a way that commands constitute nodes in the tree structure. A node is associated with another node by a line being drawn between them.

Figure 2:
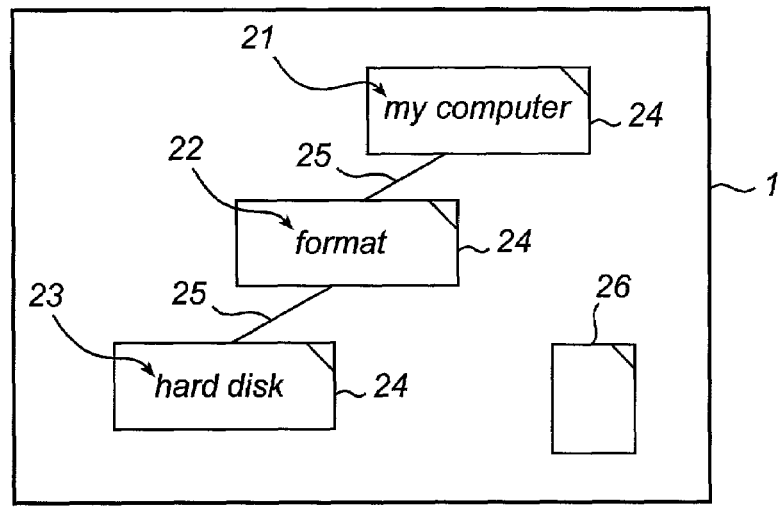
FIG. 2 shows an exemplary embodiment of a base with graphically noted commands and associations according to a first application of the present invention.

The commands 22, 23 can thus constitute conditions, operators, parameters or subordinate commands, as shown in FIG. 2. It is recognized that the tree structure with commands can vary in extent, from a single chain of commands to a large tree with many commands and subordinate commands.

A command frame 24 may be noted around each command. The command frame 24 may work in such a way that it delimits a part of the base 1 which is to be associated with the command and also in such a way that it is recognized by the sensor device 2 and understood as an indication that a command is being entered and thus work as a command indicator. Between the commands 22, 23 or the command frames 24 lines may be drawn which indicate connections between the commands.

Figure 3:
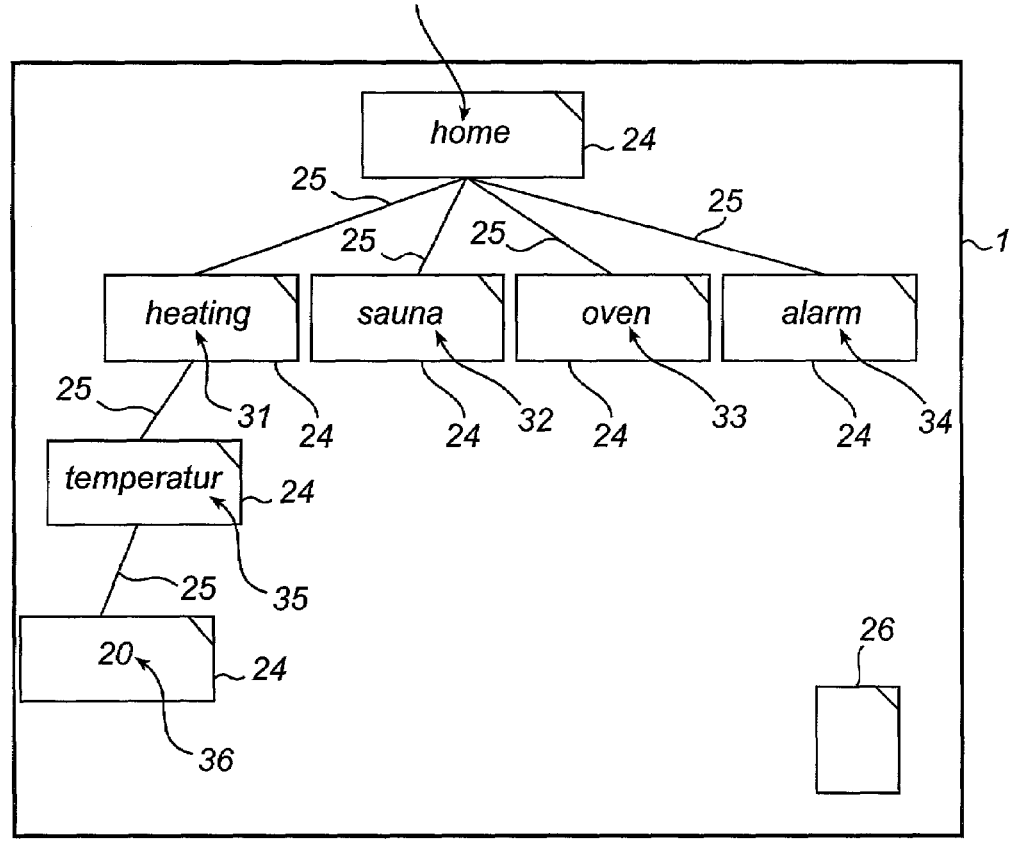
FIG. 3 shows an exemplary embodiment of a base with several graphically noted commands and associations according to a second application of the present invention.
Figure 4:
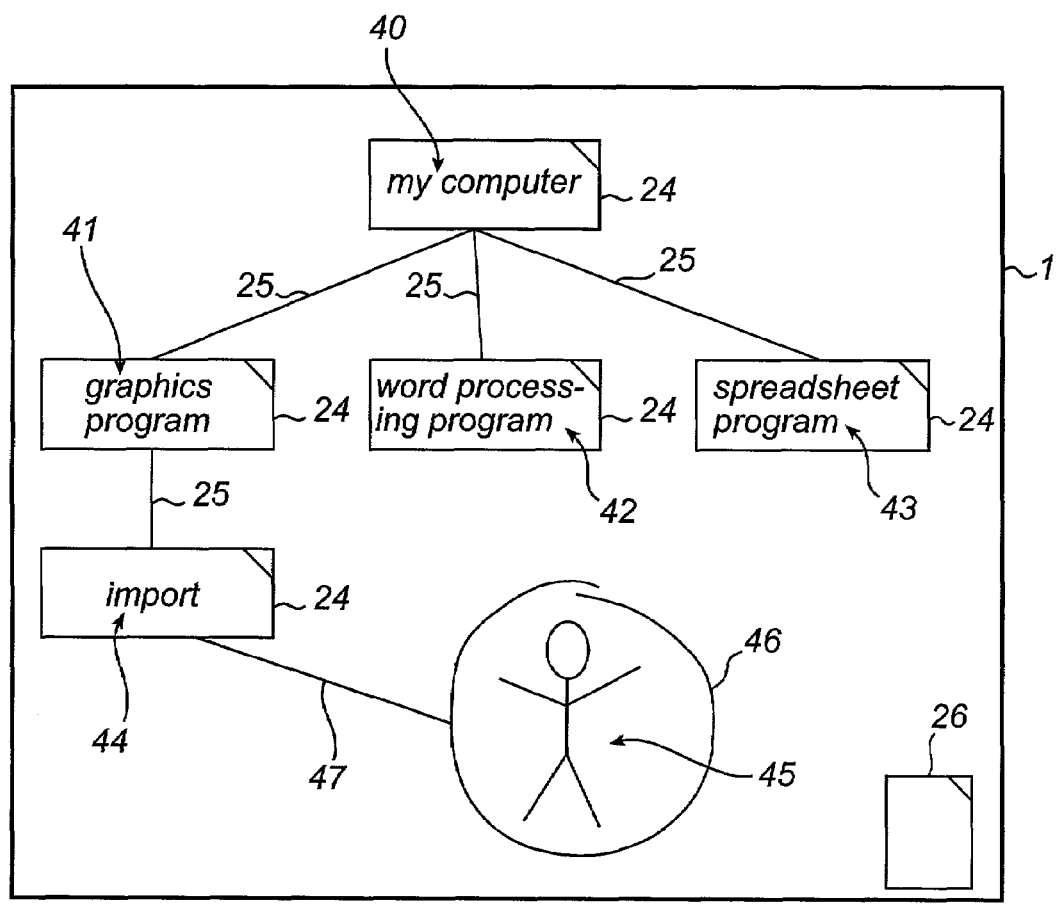
FIG. 4 shows an exemplary embodiment of a base with several graphically noted commands and associations according to a third application of the present invention.

The shape of the command frames in FIGS. 2–4 constitutes only one example of how such frames can be designed. Other shapes are possible and different shapes can represent different types of commands or addresses. On the base 1 there is also a "send" box 26 which indicates to the sensor device that the commands are to be sent to the unit provided with a processor. The "send" box 26 can be either a pre-printed box comprising a specific, predefined part of the position-coding pattern which codes for the "send" function, or alternatively the "send" box 26 can be noted by the user on the base 1 and provided with a particular symbol or a particular command word which represents the "send" function. As another alternative, the "send" box can be omitted, by for example the sensor device connecting directly to the computer network address when it identifies a command box or an indication of a computer network address.

As shown in FIG. 2, the user has noted the address "my computer" 21 with a sensor device 2, which indicates to the sensor device 2 the computer network address of the user's own computer. Around the address the command frame 24 is noted, which defines the subarea of the position-coding pattern which after the input will be associated with the address by the sensor device. At the same time as the noting is carried out, the sensor device reads off the position-coding pattern and forms an electronic representation of the graphical image that the address 21 and the command frame 24 constitute. The graphical image is then interpreted using OCR or ICR, so that an electronic form of the command "my computer" is obtained and is stored in a memory in the sensor device. Optionally, the address is stored together with an indication that the noted "my computer" is an address and not just a text string. As an alternative, the address derived by the sensor device, for example 197.57.3.982, can be stored. A representation of the surface on the base 1 which is enclosed by command frame 24 is also stored in the sensor device and associated with the address "my computer" as an association with an IP address, here exemplified by 197.57.3.982.

When the user notes the command "format" 22 and the second command "hard disk" 23 and the command frames 24, the same procedure is repeated: the noted commands are recorded in electronic form, interpreted and stored together with the indication that they constitute commands and with the subareas of the base 1 with which they are associated. When the user then notes associations 25 between the commands 22, 23, this is also recorded and stored as indications of how the commands 22, 23 are related to each other.

A command string is formed in the sensor device from the stored commands 22, 23 and associations 25, the first component of the command string consisting of the address that constitutes a root in the tree-like command structure, that is the address "my computer". Next associations 25 are followed, until the last command "hard disk" 23 is reached, whereupon the command string is built up gradually and finally assumes, for example, the form my computer/format/hard disk or alternatively 197.57.3.982/format/hard disk Command strings may be formed and stored in different ways. According to one alternative, each command string that may be formed from a given command structure or hierarchy may be stored. According to this alternative, new command strings are added as new commands or parameters are added to the command structure.

According to another alternative, a tree structure that has been noted graphically and registered may be represented in any appropriate way in the sensor device, such as by means of any data structure for representing tree structures. When a certain command is selected, by e.g. registering a pair of coordinates within the command frame on the base, the corresponding command string is formed from the marked command or parameter and all other commands or parameters through the root.

When the user marks the "send" box 26, the command string is sent to the computer network address that is indicated by the address "my computer", whereupon the unit 3 provided with a processor and connected to the computer network address executes the command and its hard disk is formatted.

In one exemplary embodiment of the present invention, the unit 3 provided with a processor then sends an acknowledgement to the sensor device 2 that the command has been carried out. The acknowledgement can be presented to the user in the form of a sound, light or vibration signal in the sensor device or by being displayed on some other unit in the vicinity of the user, such as a mobile telephone or hand-held computer.

A second application of an exemplary embodiment of the present invention will now be described with reference to FIG. 3. On a base 1 provided with a position-coding pattern, an address 30 and a number of commands 31, 32, 33, 34, 35, 36, surrounded by command frames 24 and connected by associations 25, have been noted in a similar way to that described above with reference to FIG. 2. The commands have been noted and linked together into a tree-like structure, where an address "home" 30 indicates a computer network address, e.g. of a unit which is situated in the user's intelligent home, which unit is arranged to control one or more units provided with a processor in the user's home. Alternatively, each unit provided with a processor in the user's home can have a network address and can be connected directly to the computer network, without any master unit as in the example.

A number of units provided with a processor are connected to the computer network address, which units are addressed by the commands 31, 32, 33, 34. Other types of units are possible and are to be regarded as covered by the invention. Each unit can then be provided with a number of commands or parameters for its control. In FIG. 3, the tree structure is drawn out in full only for the temperature control of a heating system, but it is recognized that the structure can be extended as new units are added, or as existing units are provided with new functions.

It is also recognized that the tree structure shown in FIG. 3 is drawn mechanically and that for the purpose of illustration it shows a larger part of the tree structure than what is necessary for the example. In an actual application the tree structure or command hierarchy may be hand-drawn, and only that part of the structure, that is those commands, which are to be used are drawn, as in FIG. 2. Alternatively, predefined and printed or machine drawn command structures, or parts thereof, are conceivable. These may e.g. be provided by the manufacturer of a certain household appliance. Such predefined command hierarchies may be expandable by e.g. allowing the user to add further parameters or commands. It is also possible that the manufacturer of a household appliance provides a complete, predefined command hierarchy containing all the necessary commands or parameters for an appliance or a group of appliances. The command hierarchy may be provided in the form of a control base, e.g. a sheet or a paper, provided with the position-coding pattern, on which the command hierarchy is pre-printed, but where the address has not been filled out.

A corresponding electronic version of the command hierarchy may be provided in the form of software for installation in the sensor device. The software provides the necessary instructions for the sensor device to associate the subareas of the position-coding pattern with the proper command.

The user may install the appliance by filling in his address with the sensor device, at the proper position in the command hierarchy, thus making the appliance controllable by means of the sensor device. Once the command hierarchy has been installed in the sensor device, the user may use it and add commands according to what has been described above.

Thus, the appliance manufacturer may provide its customer with a product kit comprising the control base and software for installation of the command hierarchy in the sensor device.

A command 35 which indicates the temperature parameter and a value command 36 for this are marked and connected by means of an association line 25. The command string which is generated for setting the temperature of the heating installation is home/heating/temperature/20, whereupon the heating installation in the user's home sets the temperature to 20 degrees, in response to the user sending the command string to the computer network address, which is indicated by the address "home" by marking the node containing the temperature parameter and then the "send" box 26. It is recognized that similar command structures can be constructed for all the other units 31, 32, 33, 34, whereby setting parameters and values can be entered and sent to the units 31, 32, 33, 34.

FIG. 4 shows a third application of an exemplary embodiment of the present invention. According to this application, the input is carried out to programs in the user's computer 3 (FIG. 1). Also in this case, an address 40 and a number of commands 41, 42, 43, 44 have been drawn on a base 1 and connected by associations 25 and marked with command frames 24. A "send" box 26 is also arranged on the base 1. A sketch 45 has also been noted on the base and recorded in electronic form. The command structure in FIG. 4 comprises an address "my computer" 40 which indicates the address of the user's computer, and a graphics program 41, a word processing program 42 and a spreadsheet program 43 which are installed in the user's computer 3.

In this example, the input of data in the form of a sketch to the graphics program 41 is described, but it is recognized that input to the word processing program 42 and the spreadsheet program 43 can be carried out analogously. Practically all information that can be noted on a base can also be transferred in this way. Other examples are calendar information, memos, database entries, etc.

As a subordinate command to the graphics program, the command "import" 44 has been noted and recorded in electronic form using the sensor device. The sketch 45 is connected by a line 47 to the command "import" 44. The sketch 45 is stored in the sensor device in the form of graphical data, below called "image data". More specifically, the sketch is stored as a graphics file, e.g. a vector graphics file. This can be in a standard storage format such as .wmf (Windows® Meta File) or in a storage format specific to the sensor device. The file is transferred to the unit provided with a processor before the command is executed or in association with the command being executed.

In response to the "send" box being marked, the following command string is sent to the unit 3 provided with a processor:

my computer/graphics program/import/image data.

The unit 3 provided with a processor receives the command string and the image and causes the graphics program to import the image. When a standard storage format is used, the importing to the graphics program can be carried out by the program's existing capability of being executed by indicating a command string comprising a file name. However, if a storage format specific to the sensor device is used, it is necessary for the program that receives the image data to have been provided with functionality for handling the storage format of the sensor device.

It is recognized that additional commands to the graphics program can be noted on the base 1 and used for more precise control of the input of the sketch 45. As an alternative, the area that is to constitute image data can be marked in order to delimit it from other areas that are not required to be transmitted to the unit 3 provided with a processor. Such a mark 46 is shown in FIG. 4.

A base 1 on which commands are noted can be used repeatedly by the commands being stored in a memory in the sensor device when the noting is carried out. This may mean that the user can indicate to the sensor device which command is to be carried out by pointing at a written-down command with the sensor device so that the sensor device can read off the position-coding pattern corresponding to the command. The sensor device may identify this command in its memory and send it to the address with which the command was associated when the noting on the base was carried out. This may be done by simply recording a pair of coordinates within the proper subarea of the position-coding pattern, without marking any "send" box.

According to another exemplary embodiment of the present invention, further commands or parameters defining a previously noted and recorded command may be added by being noted graphically on the base and associated with the command in question. In this way, a dynamic command structure is obtained, which can be enlarged as new units are added or enlarged with new commands. Commands that has been added to the command hierarchy in this manner will thus constitute parts of the command hierarchy as described above.

Figure 6:
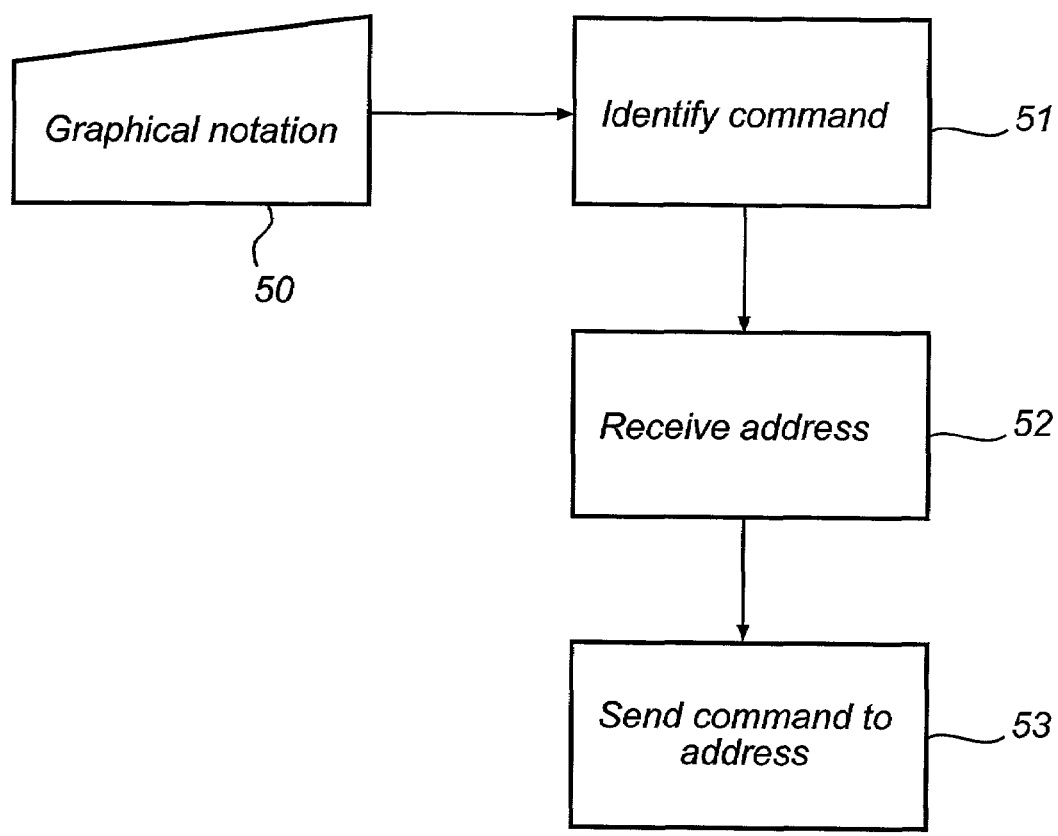
FIGS. 6–12 illustrate flow charts, showing exemplary methods for controlling a unit provided with a processor according to the present invention.
Figure 7:
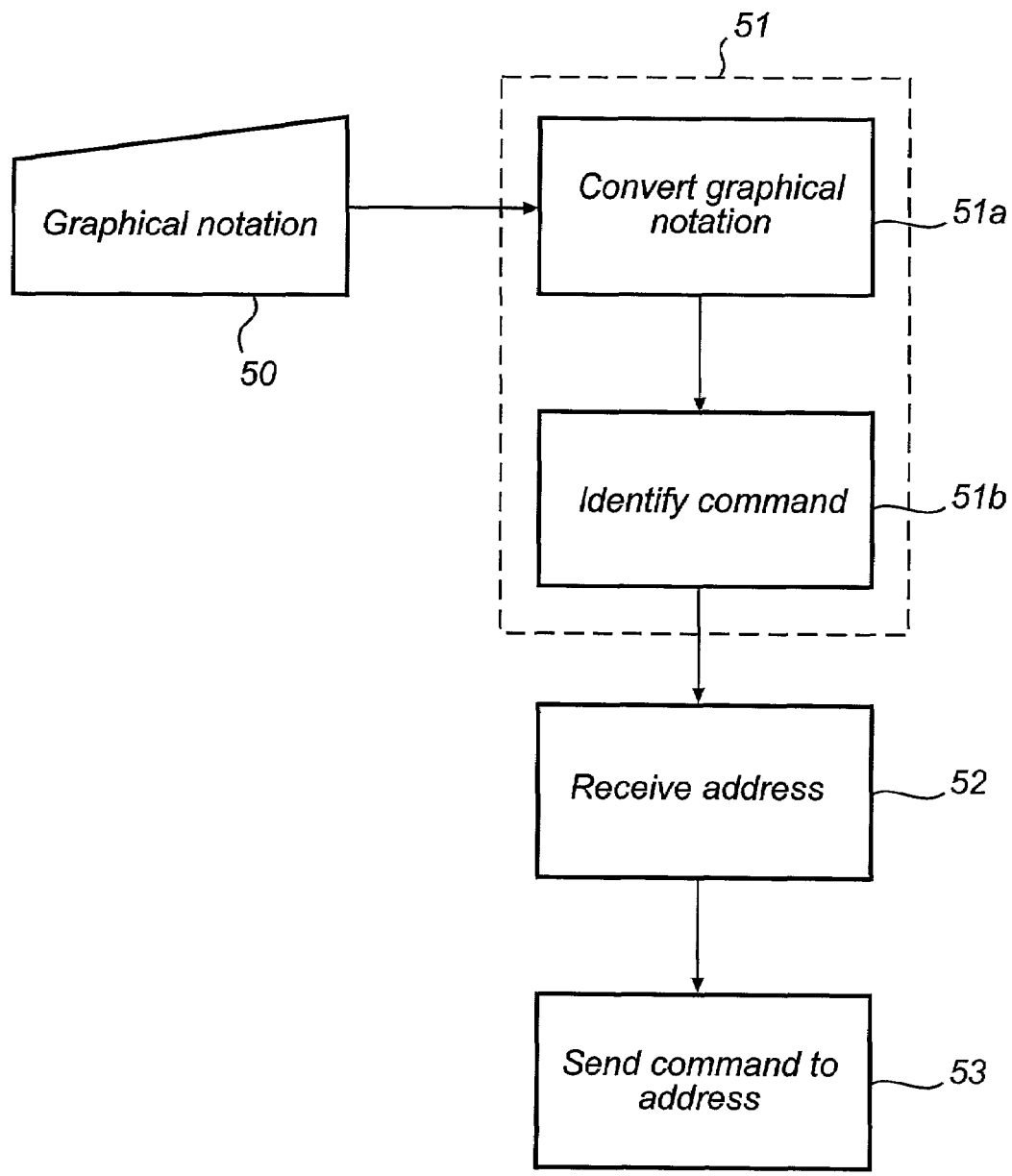

The methods described here may be implemented as a computer program product, as shown in FIGS. 6 and 7. The computer program product comprises a computer program which is stored in the program memory of the sensor device and is executed in its processor. As an alternative, the method can be implemented completely or partially in the form of a product-specific circuit, such as for example an ASIC, an FPGA or in the form of digital or analogue circuits or in any suitable combination of these.

The following description is directed to the inventive method based on FIGS. 6–12, which show different embodiments of the invention, which may be used separately or in combination.

FIG. 6 illustrates a flow chart for an exemplary method according to the present invention. The method may be implemented in e.g. a computer program product. A graphical notation is received in step 50 in the sensor device 2. A command for the unit 3 provided with a processor is identified in step 51 based on the graphical notation. The sensor device also receives in step 52 an address to the unit 3 provided with a processor. In step 53, the command is sent to the address. Step 53 may be initiated in different manners, by It e.g. the sensor device 2 detecting a "send"-box on the base, by receiving a send command or any other indication such as a button being depressed etc.

FIG. 7 illustrates a flow chart for an exemplary method according to another embodiment of the present invention. In FIG. 7, the step 51 for identifying the command for the unit 3 provided with a processor, comprises a substep 51a of at least partly converting the graphical notation into a machine readable character format by e.g. ICR (intelligent character recognition) or HWR (handwriting recognition), based on the output from step 51a, whereupon the command may be identified in step 51b. Thus, a command that is written in plain text may be identified, either directly from the actual combination of machine readable characters, or by retrieving a related command from a database on the basis of the character combination. Likewise, the sensor device may be arranged to identify an address from such a character combination (step 52).

Figure 8:
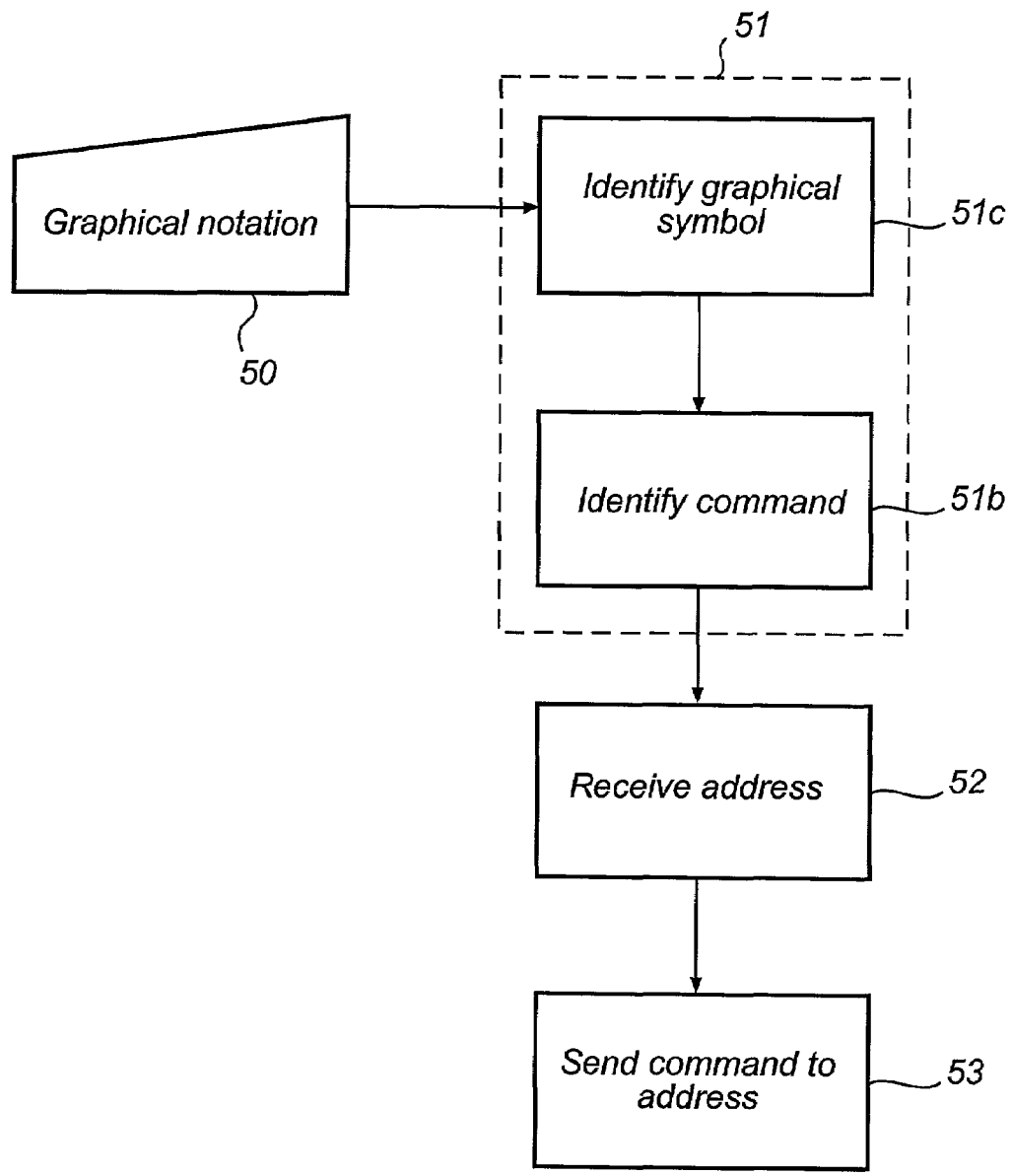

FIG. 8 illustrates a flow chart for an exemplary method according to another embodiment of the invention. In FIG. 8 the step 51 of identifying the command comprises a first substep 51c of identifying a graphical symbol, which may be predefined, and thus recognized, as being equivalent to a certain command. In a second substep 51b, the corresponding command is identified. For example, a cross mark ("X") could be interpreted as a "delete" command. Likewise, the sensor device may be arranged to identify an address from such a graphical symbol (step 52).

Evidently, the embodiments of FIGS. 7 and 8 may be combined, by the sensor device being capable of first determining whether a command or address is recorded in plain text or not, and then identifying the command or address based on either a character combination or a graphical symbol.

Further commands may be added in additional steps (not shown) corresponding to those described in FIGS. 6–8.

Figure 9:
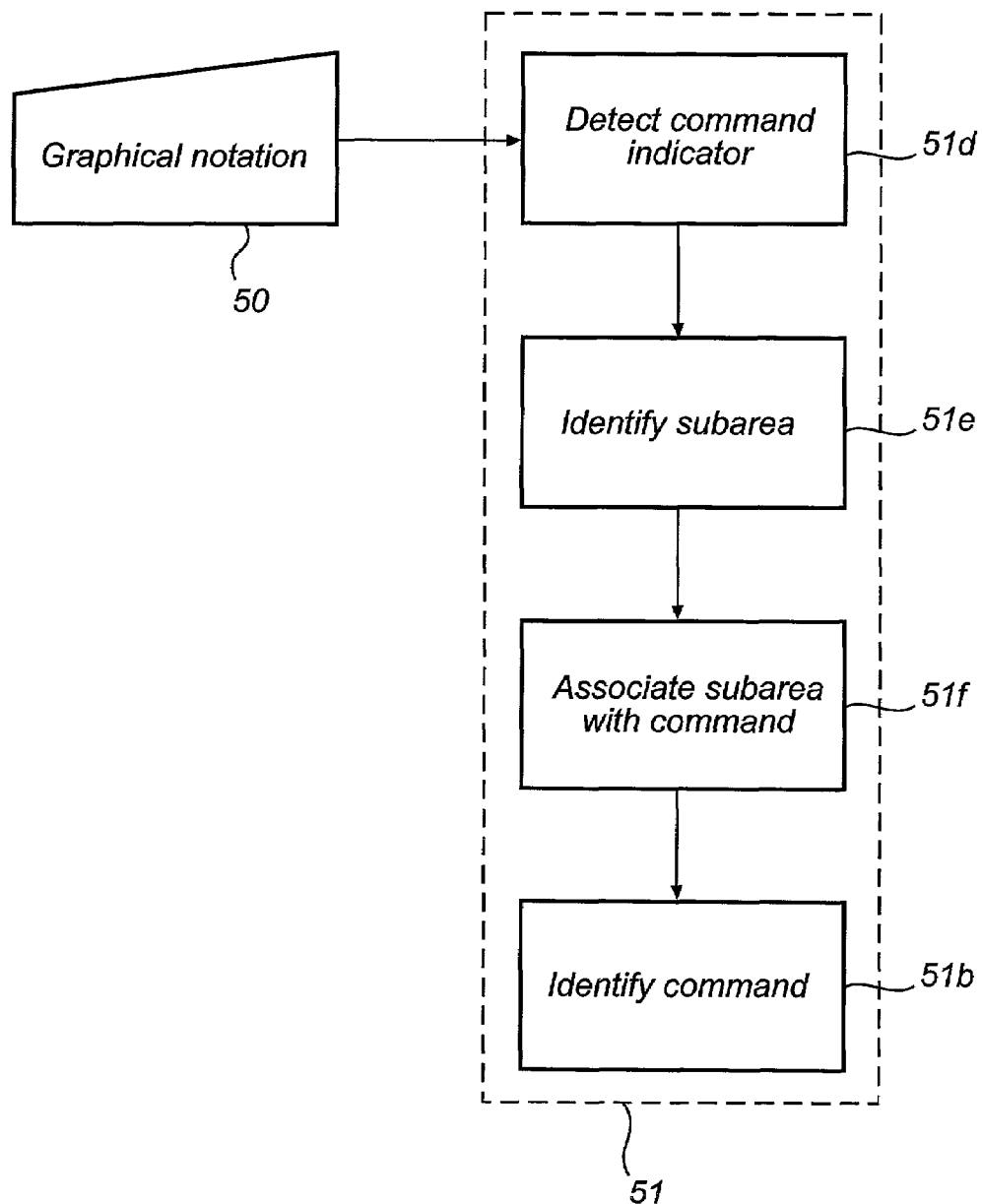

FIG. 9 illustrates a flow chart for an exemplary method according to yet another embodiment of the present invention. In FIG. 9, the step 51 of identifying the command further comprises the substep 51d of detecting a command indicator, such as the command indicators 24 of FIGS. 2–4. In connection with the detection of the command indicator, a subarea of the position-coding pattern may be identified in step 51e. The subarea may be associated with the command in step 51f, such that a recording of a pair of coordinates within the subarea will be interpreted by the sensor device as being equal to a recording of the associated command.

Figure 10:
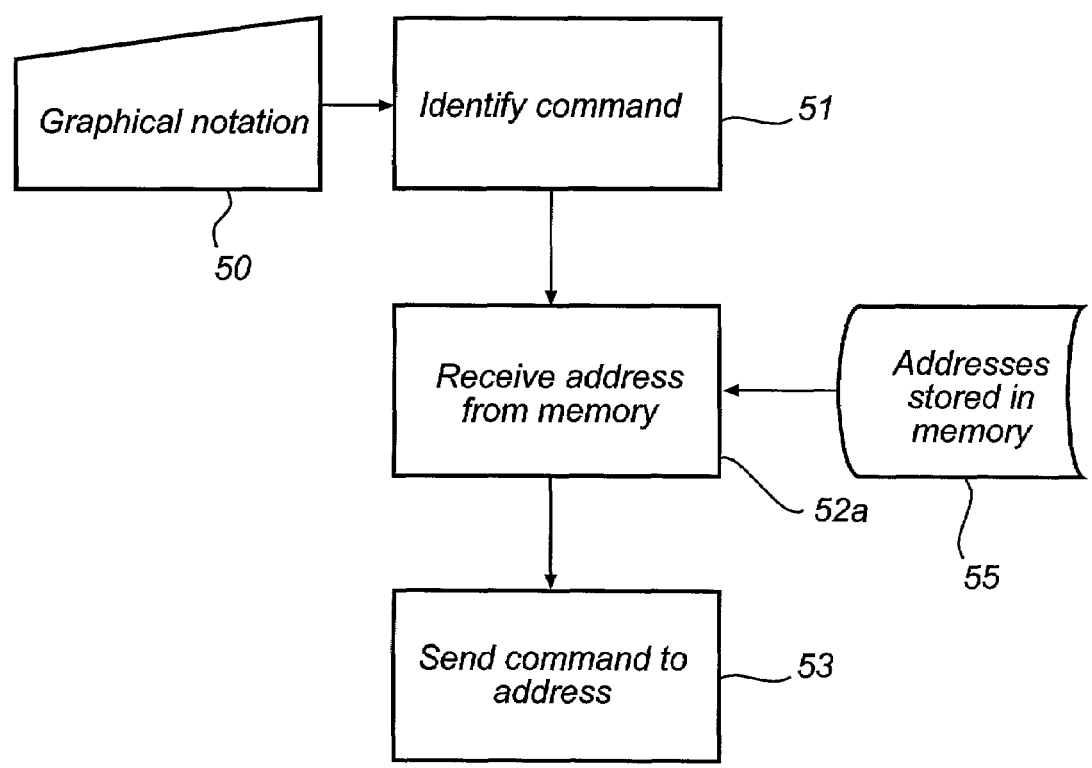

FIG. 10 illustrates a flow chart for an exemplary method according to a further embodiment of the present invention. In FIG. 10 the step 52a of receiving the address comprises receiving the address from a memory 55, which may be incorporated in the sensor device 2.

Figure 11:
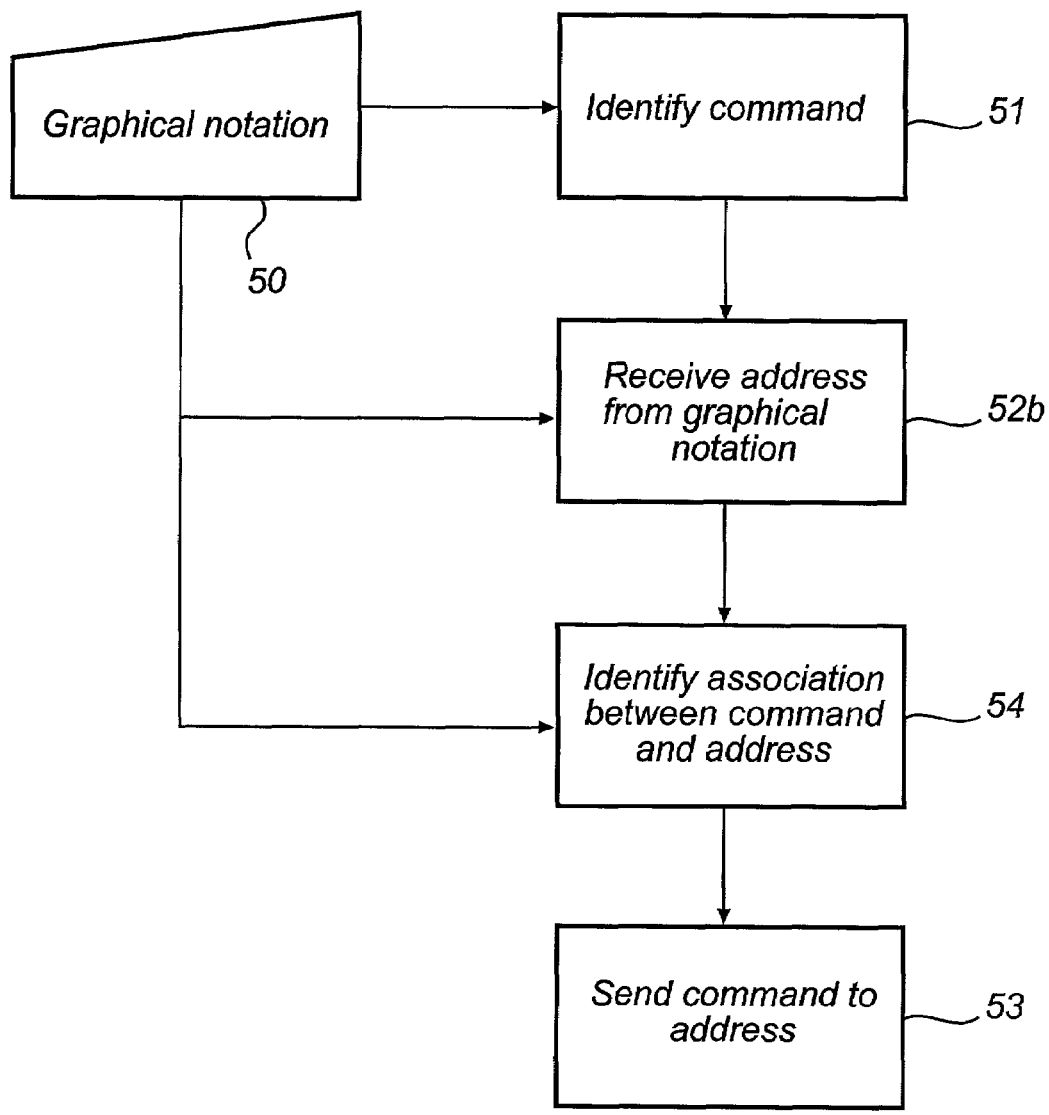

FIG. 11 illustrates a flow chart for an exemplary method according to another embodiment of the present invention. In FIG. 11, the command (in step 51), the address (in step 52b) and the association (in step 54) are all identified based on the graphical notation 50.

Figure 12:
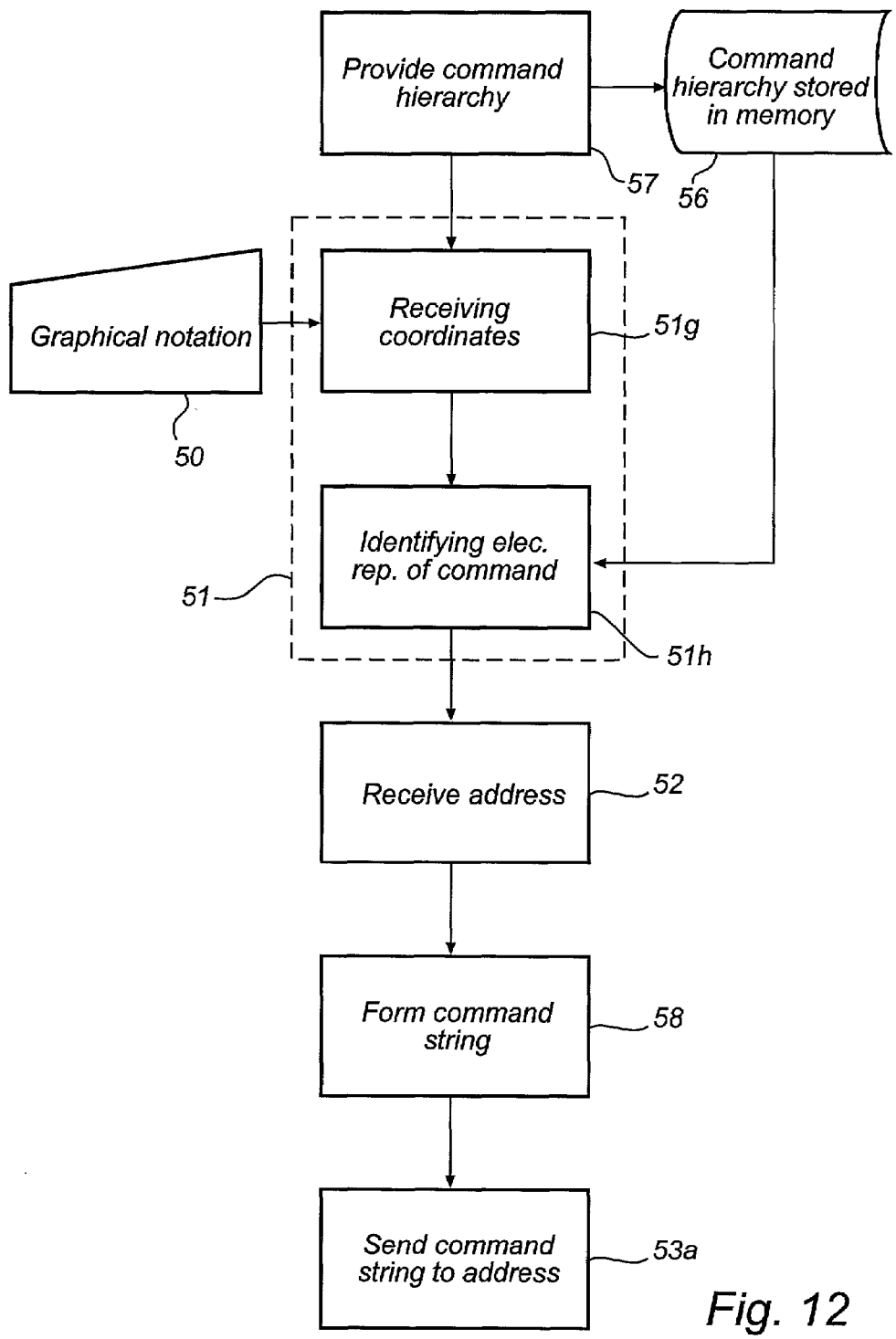

FIG. 12 illustrates an exemplary embodiment of a method according to the present invention, in which a command hierarchy in step 57 has been provided in a memory 56 of the sensor device 2. The command hierarchy may be provided by storing graphical notations that has been made at earlier occasions. It may also be provided by downloading into the memory 56 from e.g. an external memory medium, e.g. via any one of the communication paths discussed above in relation to FIG. 1. In the memory 56, commands may be e.g. associated with subareas of the position-coding pattern.

In FIG. 12, the step 51 of identifying the command may comprise a substep 51g of receiving a pair of coordinates from a subarea that is associated with the command. Thus, in substep 51h, the command associated with the subarea is identified.

FIG. 12 also illustrates that based on the command hierarchy, command strings may be formed. The command strings may be formed while commands are being entered through graphical notations or in response to a command being identified through e.g. a graphical symbol or through a pair of coordinates within a predefined subarea.

Different procedures for preprogramming or predefining addresses and/or commands are conceivable.

One alternative is to use a special purpose form provided with a position-coding pattern, where the user, in e.g. dedicated boxes, writes a short name, an address or a command that is to be made identifiable for the sensor device.

Another option is to perform the preprogramming by means of a unit that communicates with the sensor device, such as a computer, a PDA etc. Such a unit may communicate via e.g. a computer network or via short range communication such as Bluetooth® or IrDA.

From the above description, it should be apparent to the person skilled in the art that different embodiments of the method according to the invention may be combined and that the steps may be performed in different order.

The graphical notation may also comprise e.g. data in the form of e.g. figures, text, sketches or graphics, which is recorded by the sensor device 2 and associated with commands or addresses as described above with reference to FIG. 4.

The sensor device may be programmed to evaluate the graphical notations as they are received, based on their contents. For example, a plain text command, a graphical symbol or a command indicator may trigger the above described method of identifying commands. All other, non-recognized data may be treated in any standard fashion, such as may be stored as strokes, i.e. sequences of coordinate pairs, in the memory 1 of the sensor device 2.

The invention can also be varied in other ways within the scope and spirit of the present invention.

For example, many different types of position-coding pattern are conceivable, in addition to those shown herein. The position-coding pattern does not necessarily need to be optically detectable. It could, for example, be readable by magnetic, capacitive, inductive, chemical or acoustic means. However, this would require a different type of sensor to be used.

The position-coding pattern in WO 01/26032 can code coordinates of a very large number of unique positions or points. It can be considered as though all these points together make up an imaginary surface which is considerably larger than any single base. This imaginary surface can be divided into different areas which are reserved for different applications. An area can, for example, be reserved for controlling units provided with a processor. Information defining such areas and functions connected thereto can be stored in the pen and utilized for controlling the function of the pen.

Another alternative is to allow commands to be noted within practically any part of the imaginary surface. In this way almost any surface which is provided with a position-coding pattern can be used for entering commands and for the associated control of a unit provided with a processor. In this embodiment measures may possibly need to be taken to prevent interference, as certain areas can previously have been reserved for certain functions.

The address to which commands and data are sent can be identified by, for example, looking up addresses in a database external to the sensor device. Both commands and address could be sent to an external unit for interpretation and further processing. This interpretation can be carried out in the sensor device, in the unit provided with a processor, or in some other external unit, possibly dedicated to the purpose.

It is further possible to determine in advance the address to which the command string is to be sent, for example, by the sensor device being pre-programmed with such information. According to this embodiment, it is not necessary to note an address graphically. At least one command can be noted, but command structures as described above can also be noted and stored according to this embodiment. Alternatively, the address to which the command string is to be sent may be associated with a specific area of the position-coding pattern, and thus with a specific base on which that area of the position-coding pattern is arranged.

As an alternative to storing the commands as a dynamic structure, it is possible to store a plurality of command strings where each command string represents a conceivable combination of commands.

The form in which the commands and the address are sent can also vary: it is, for example, possible to send raw data in the form of the images which the sensor device takes of the base. It is also possible to send some form of processed, for example compressed, image data, a series of coordinates which has been derived from the images and which represents the movement of the sensor device across the base, or commands or address in character-coded format. Other ways of sending commands, addresses or data are not excluded.

It is also possible to permit association of commands and/or data that are on different bases. This could, for example, be carried out by an address being noted on a first base and a command being noted on a second base, then the address and the command are linked by the bases being arranged next to each other, after which a line is drawn between the address and the command. The discontinuity in the position-coding pattern which then probably arises, can be handled by the sensor device, e.g. by creating an association between the two areas of the position-coding pattern on the respective side of the discontinuity, such as is described in WO 01/75781, which is hereby incorporated through this reference.

The sending of address, commands and data to the unit provided with a processor can be initiated by the use of the "send" button, but can also be initiated in response to an indication being written down on the base. For example, the drawing of a frame around a command can initiate transmission. It is also possible to initiate transmission as soon as the sensor device has recorded a complete command string, or when a partial area within a frame is marked which surrounds an already written-down command. Further alternatives for initiating sending comprises, but is not limited to voice control, depressing a button on the pen etc.

In addition, entry of addresses and commands can be marked by, for example, the user pressing a button on the sensor device. This can precede the entry of a command, but the button can also be held depressed during the whole or part of the entry procedure.

Although preferred and exemplary embodiments of the present invention have been described in detail herein, it should be understood that many variations and/or modifications of the inventive concepts herein taught still fall within the spirit and scope of the present invention.

What is claimed is:

1. A method for controlling a unit provided with a processor, comprising:
   receiving at least one graphical notation in the form of positions representing a sensor device's movement across a base that is provided with a position-coding pattern, while the graphical notation was made;
   establishing a subarea of the position-coding pattern and at least one command for said unit provided with a processor, based on said at least one graphical notation;
   storing, in response to the establishing of the command and subarea, an association between the command and the subarea;
   receiving an address to the unit provided with a processor; and
   controlling the unit provided with a processor by sending said at least one command to the address.

2. The method as claimed in claim 1, wherein said at least one graphical notation at least partly comprises handwritten characters.

3. The method as claimed in claim 1, wherein said at least one graphical notation is at least partly converted into a character coded format for identifying said at least one command.

4. The method as claimed in claim 1, wherein the establishing said at least one command comprises identifying at least one graphical symbol from said at least one graphical notation, said graphical symbol representing said at least one command.

5. The method as claimed in claim 1, wherein the establishing said at least one command comprises detecting a command indicator, based on said at least one graphical notation.

6. The method as claimed in claim 5, wherein said subarea being essentially encircled by said command indicator.

7. The method as claimed in claim 1, further comprising:
   recording at least one pair of coordinates within the subarea; and
   sending least one subsequent command, having already been established, to the address in response to the recording.

8. The method as claimed in claim 1, wherein receiving the address comprises receiving the address from a memory in the sensor device.

9. The method as claimed in claim 1, wherein said establishing, based on said at least one graphical notation, includes identifying at least one association between said address and said at least one command.

10. The method as claimed in claim 1, wherein said receiving the address comprises receiving the address based on said at least one graphical notation.

11. The method as claimed in claim 10, wherein said receiving at least one graphical notation comprises receiving at least three separable graphical notations representing said address, said at least one command and said at least one association between said address and said at least one command.

12. The method as claimed in claim 11, wherein said at least one association is identified based on a separable graphical notation connecting the graphical notations representing said at least one command and said address, respectively.

13. The method as claimed in claim 12, wherein said at least one association is identified as a graphical notation having essentially the shape of a line extending between said graphical notations representing said at least one command and said address.

14. The method as claimed in claim 1, further comprising providing, in a memory in said sensor device, an electronic representation of a command hierarchy which comprises at least two commands and at least one association, each of said at least two commands and said at least one association being graphically represented on said base by nodes and arcs, respectively, and each of said at least two commands being associated with a respective subarea of the position-coding pattern.

15. The method as claimed in claim 14, wherein said providing said electronic representation of said command hierarchy at least partly includes identifying said command hierarchy based on said at least one graphical notation.

16. The method as claimed in claim 14, wherein said providing said electronic representation of said command hierarchy at least partly includes electronically receiving said electronic representation of said command hierarchy.

17. The method as claimed in claim 14, wherein said providing said electronic representation of said command hierarchy comprises:
- identifying, based on said at least one graphical notation, at least one further command and at least one further association, and
- storing, in a memory of said sensor device, said at least one command and said at least one further command, based on said at least one further association.

18. The method as claimed in claim 14, wherein said electronic representation of said command hierarchy is stored in a tree data structure in the memory of said sensor device.

19. The method as claimed in claim 14, wherein said electronic representation of said command hierarchy is stored in the form of at least one command string which is formable based on said electronic representation of said command hierarchy.

20. The method as claimed in claim 14, further comprising forming at least one command string based on the command hierarchy, and
- controlling the unit provided with a processor by sending the command string to the address.

21. The method as claimed in claim 20, further comprising:
- receiving a pair of coordinates from one of said subareas, said pair of coordinates representing a subsequent command having already been established; and
- identifying an electronic representation of said chosen command, wherein said command string is formed based on said chosen command and at least one hierarchically superior command.

22. The method as claimed in claim 14, wherein said base, on which the graphical notation is made, is provided with a graphical representation of at least a part of said command hierarchy.

23. The method as claimed in claim 14, wherein said receiving the address comprises receiving the address from a memory in the sensor device.

24. The method as claimed in claim 14, wherein said receiving the address comprises identifying the address based on said at least one graphical notation.

25. A computer program product stored in a computer readable medium for controlling a unit provided with a processor, said computer program product comprising instructions for controlling a sensor device, the instructions comprising:
- instructions causing the sensor device to receive at least one graphical notation in the form of positions representing a sensor device's movement across a base that is provided with a position-coding pattern, while the graphical notation was made;
- instructions for establishing a subarea of the position-coding pattern and at least one command for said unit provided with a processor, based on said at least one graphical notation;
- instructions for storing, in response to the establishing of the command and subarea, an association between the command and the subarea;
- instructions for receiving an address to the unit provided with a processor; and
- instructions for controlling the unit provided with a processor by sending said at least one command to the address.

26. An apparatus for controlling a unit provided with a processor, comprising:
- a sensor; and
- a signal processor for receiving positions representing the sensor's movement across a base that is provided with a position-coding pattern, the signal processor is capable of:
- receiving at least one graphical notation in the form of said positions;
- establishing a subarea of the position-coding pattern and at least one command for said unit provided with a processor, based on said at least one graphical notation;
- storing, in response to the establishing of the command and subarea, an association between the command and the subarea;
- receiving an address to the unit provided with a processor; and
- controlling the unit provided with a processor by sending said at least one command to the address.

27. The apparatus as claimed in claim 26, wherein the signal processor receiving-the-address-function comprises identifying the address based on said at least one graphical notation.

28. The apparatus as claimed in claim 26, wherein the signal processor is capable of identifying, based on said at least one graphical notation, at least one association between said address and said command.

29. A method as claimed in claim 1, wherein the subarea is identified by a command indicator which indicates the limits of the subarea.

30. A method as claimed in claim 1, wherein said unit is controlled at least a second time in response to the receipt of graphical notation made within said subarea.

31. The method of claim 1, wherein a user creates said graphical notation using said sensor device which records said graphical notation in the form of positions, said graphical notation indicating said command to said unit provided with said processor and said subarea of the position coding pattern.

32. The computer program product of claim 25, wherein a user creates said graphical notation using said sensor device which records said graphical notation in the form of positions, said graphical notation indicating said command to said unit provided with said processor and said subarea of the position coding pattern.

33. The apparatus of claim 26, wherein a user creates said graphical notation using said sensor device which records said graphical notation in the form of positions, said graphical notation indicating said command to said unit provided with said processor and said subarea of the position coding pattern.

* * * * *